United States Patent
Friend et al.

(10) Patent No.: US 11,286,142 B2
(45) Date of Patent: Mar. 29, 2022

(54) FUEL TANK LIFTING APPARATUSES AND METHODS OF USE

(71) Applicant: Toyota Motor Engineering & Manufacturing North America, Inc., Plano, TX (US)

(72) Inventors: Ronald Scott Friend, Jeffersonville, KY (US); Robert Aaron Allex, Ewing, KY (US); Brian McElroy, Winchester, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 259 days.

(21) Appl. No.: 16/589,813

(22) Filed: Oct. 1, 2019

(65) Prior Publication Data

US 2021/0094808 A1 Apr. 1, 2021

(51) Int. Cl.
*B66F 9/18* (2006.01)
*B60K 15/067* (2006.01)

(52) U.S. Cl.
CPC .............. *B66F 9/18* (2013.01); *B60K 15/067* (2013.01)

(58) Field of Classification Search
CPC ...... B66F 7/00; B66F 7/28; B66F 7/20; B66F 7/10; B66F 7/16; B66F 9/06; B66F 9/061; B66F 9/18; B62D 65/02; B62D 65/18; Y10S 212/901; B60K 15/067; E04F 21/18; E04F 21/1888; E04F 21/1894; E04F 21/0023; E04F 13/0885
USPC .......... 414/10, 11, 12; 187/244, 274; 269/71
See application file for complete search history.

(56) References Cited

U.S. PATENT DOCUMENTS

| | | | | |
|---|---|---|---|---|
| 2,655,115 | A * | 10/1953 | Holdeman | B61K 5/00 104/32.1 |
| 4,682,926 | A * | 7/1987 | Chambers | E04F 21/1816 414/11 |
| 4,734,979 | A * | 4/1988 | Sakamoto | B23P 21/004 198/468.4 |
| 4,752,102 | A * | 6/1988 | Rasmussen | A47C 3/24 108/147 |
| 5,338,015 | A | 8/1994 | Liegel et al. | |
| 6,427,321 | B2 * | 8/2002 | Fedato | B62D 65/18 29/281.5 |

(Continued)

FOREIGN PATENT DOCUMENTS

| CN | 202007100 U | 10/2011 |
|---|---|---|
| CN | 106241679 A * | 12/2016 |

(Continued)

OTHER PUBLICATIONS

English Translation, JP 03119256 (Year: 1991).*

*Primary Examiner* — Gregory W Adams
(74) *Attorney, Agent, or Firm* — Dinsmore & Shohl LLP

(57) ABSTRACT

A fuel tank lifting apparatus includes a first lifting apparatus including a first lifting base and a second lifting base that is connected to the first lifting base by a first actuator. A positioning mount is fixedly mounted to the second lifting base. The positioning mount is configured to support a fuel tank thereon. A powered fastening gun is fixedly mounted to the first lifting base. The first actuator raises and lowers the second lifting base relative to the first lifting base. A second lifting apparatus comprising a second actuator that raises and lowers the first lifting assembly.

12 Claims, 5 Drawing Sheets

(56) References Cited

U.S. PATENT DOCUMENTS

| | | | | |
|---|---|---|---|---|
| 8,931,994 B2 * | 1/2015 | Creaney | ................... | E04G 1/22 |
| | | | | 414/11 |
| 9,815,511 B2 * | 11/2017 | Kilibarda | ............. | B62D 65/024 |
| 2008/0276769 A1 * | 11/2008 | Zach | ...................... | B62D 65/02 |
| | | | | 81/434 |

FOREIGN PATENT DOCUMENTS

| | | | |
|---|---|---|---|
| CN | 104842775 B | | 8/2017 |
| JP | 03119256 A | * | 5/1991 |
| JP | 06144315 A | | 5/1994 |
| KR | 100199894 B1 | | 6/1999 |

* cited by examiner

FUEL TANK LIFTING APPARATUSES AND METHODS OF USE

TECHNICAL FIELD

The present specification generally relates to lifting apparatuses and associated methods, and more specifically, lifting apparatuses used in lifting fuel tanks for assembly onto vehicles.

BACKGROUND

In order to install fuel tanks on vehicles during assembly, the vehicles are typically lifted to an elevated position to provide greater access to underneath the vehicle. Lifting the vehicle to the elevated position also provides greater space for locating a fuel tank under the vehicles. The fuel tanks must then be lifted and held in place for installation. However, the fuel tanks are heavy and difficult to lift and install manually. To this end, a lifting apparatus may be used to lift the fuel tank for an installation operation. What is needed are other fuel tank lifting apparatuses that are useful in lifting and installing fuel tanks on vehicles.

SUMMARY

In one embodiment, a fuel tank lifting apparatus includes a first lifting apparatus including a first lifting base and a second lifting base that is connected to the first lifting base by a first actuator. A positioning mount is fixedly mounted to the second lifting base. The positioning mount is configured to support a fuel tank thereon. A powered fastening gun is fixedly mounted to the first lifting base. The first actuator raises and lowers the second lifting base relative to the first lifting base. A second lifting apparatus comprising a second actuator that raises and lowers the first lifting assembly.

In another embodiment, a method of installing a fuel tank using a fuel tank lifting apparatus is provided. The method includes moving the fuel tank lifting apparatus toward a vehicle. The fuel tank lifting device includes a first lifting apparatus including a first lifting base and a second lifting base that is connected to the first lifting base by a first actuator. A positioning mount is fixedly mounted to the second lifting base. The positioning mount is configured to support a fuel tank thereon. A powered fastening gun is fixedly mounted to the first lifting base. The first actuator raises and lowers the second lifting base relative to the first lifting base. A second lifting apparatus includes a second actuator that raises and lowers the first lifting assembly. The first lifting apparatus is lifted using the second lifting apparatus with the fuel tank carried by the first lifting apparatus.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present description is generally directed to a fuel tank lifting apparatus that can be used to lift and install a fuel tank onto a vehicle. The fuel tank lifting apparatus includes two stages: (1) an initial lift and lower stage and (2) a final lift and lower stage. Each of the initial lift and lower stage and the final lift and lower stage is powered, for example, by pneumatics or other suitable actuator. The initial lift and lower stage uses a first lift assembly that lowers a fuel tank placed thereon to a lowered position and places the fuel tank into engagement with a set of powered fastening guns that are used to fasten the fuel tank into place beneath the vehicle. The final lift and lower stage uses a second lift assembly that raises the first lift assembly including the fuel tank to the vehicle for installation.

Figure 1:
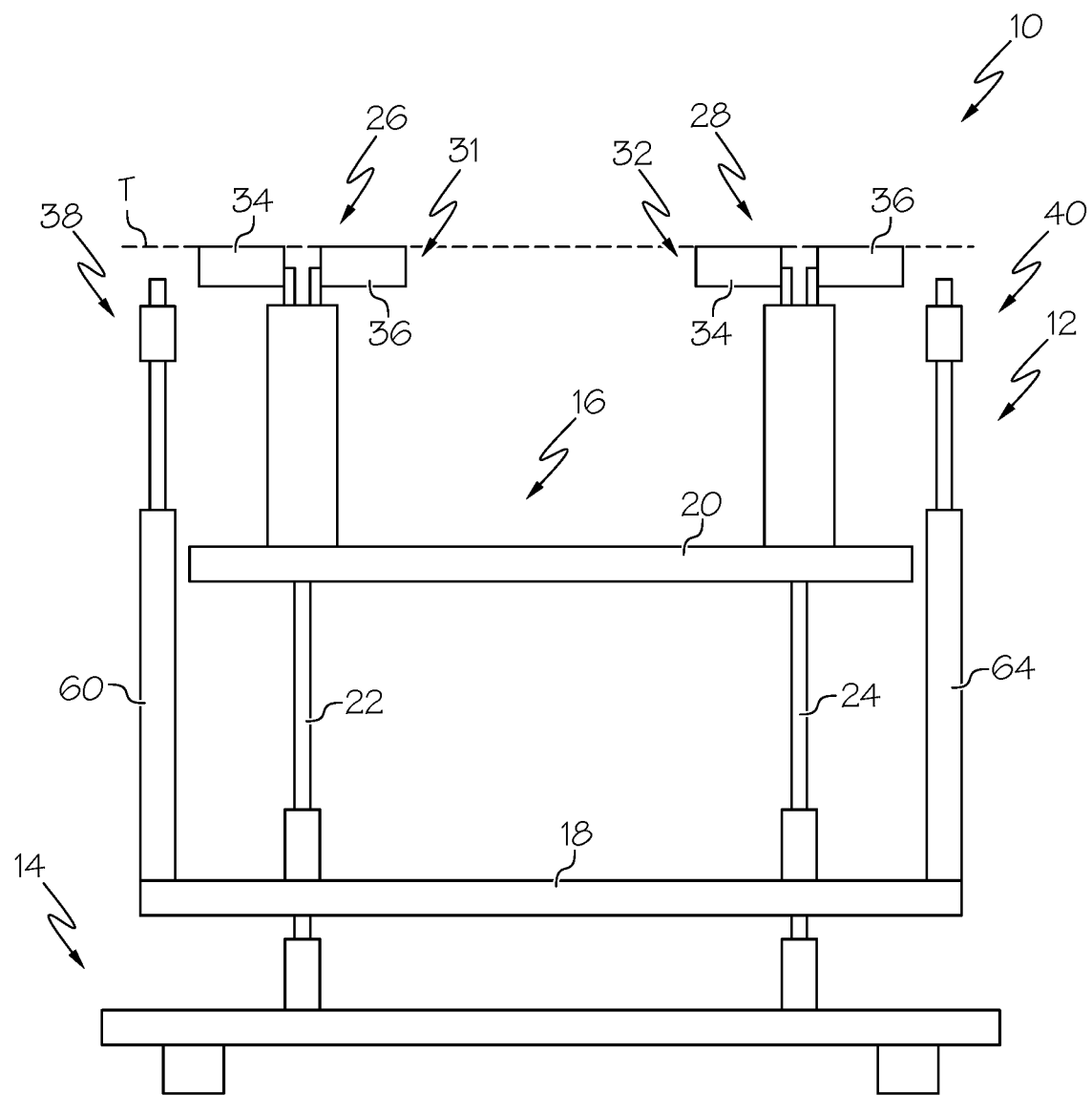
FIG. 1 is a diagrammatic end view of a fuel tank lifting apparatus with a first lifting apparatus in a raised configuration and a second lifting apparatus in a lowered configuration, according to one or more embodiments shown and described herein.

Referring to FIG. 1, a fuel tank lifting apparatus 10 includes an initial lift and lower stage, generally indicated as 12, and a final lift and lower stage, generally indicated as 14. The initial lift and lower stage 12 includes a first lifting apparatus 16 that includes a first lifting base 18 that is mounted upon a second lifting base 20. Actuators 22 and 24 are located between the first lifting base 18 and the second lifting base 20. The actuators 22 and 24 may be, for example, pneumatic cylinders or any other suitable actuator. Positioning mounts 26 and 28 are mounted to the second lifting base 20. The positioning mounts 26 and 28 may include horizontally extending positioning heads 31 and 32 formed of two horizontally extending arms 34 and 36. The positioning arms 34 and 36 may be formed of a cushioning material, such as rubber, foam, plastic, etc. suitable to contact a surface of a fuel tank located thereon. The positioning mounts 26 are arranged and located to support a fuel tank thereon before the fuel tank is lowered onto powered fastening guns 38 and 40. The powered fastening guns 38 and 40 are mounted on the first lifting base 18 using elongated support columns 60 and 64 so that they are stationary relative to movement of the second lifting base 20. While only two fastening guns are shown, there may be four fastening guns (see FIG. 4), one for each of the four corners of the fuel tank.

Figure 2:
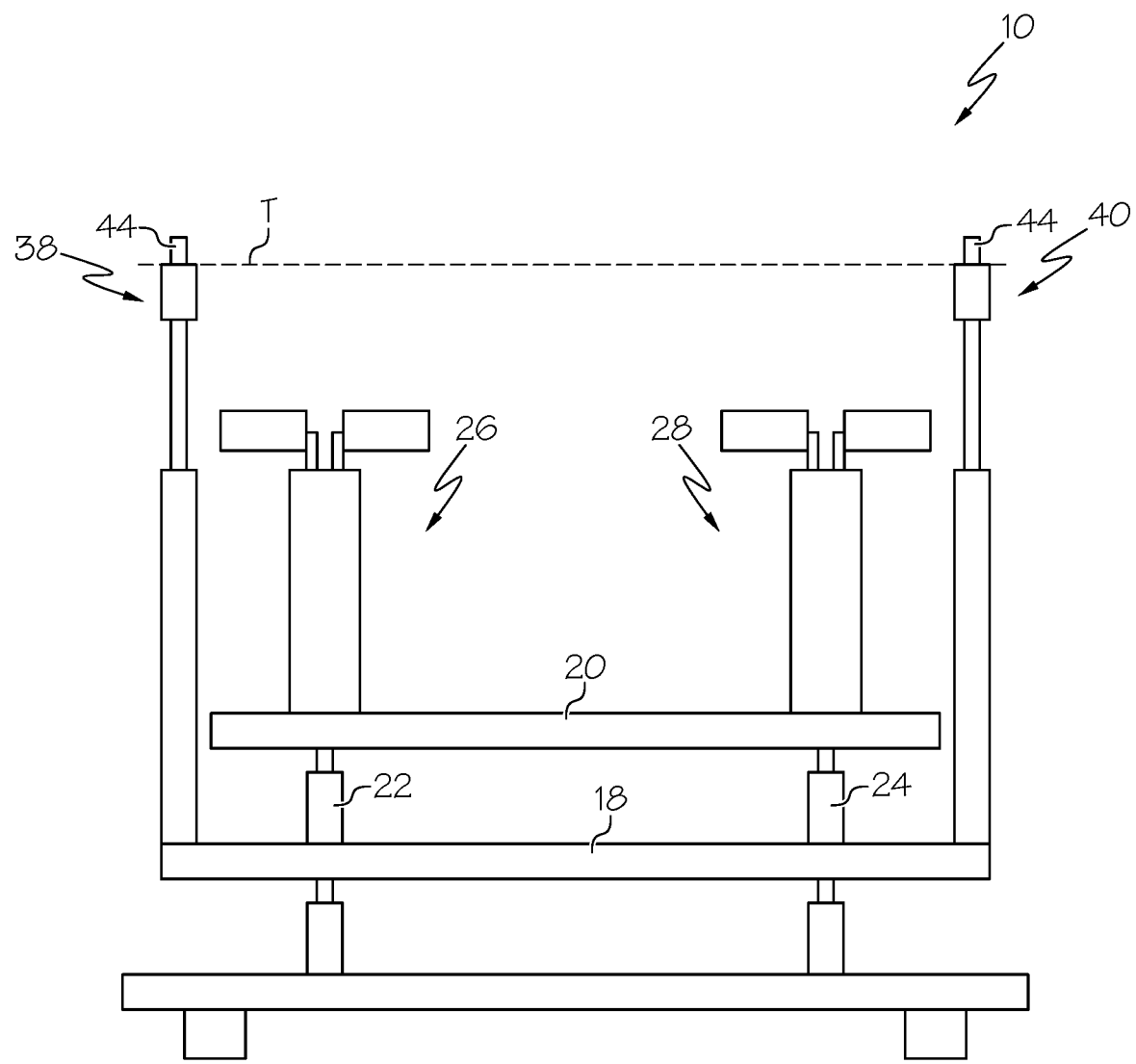
FIG. 2 is another diagrammatic end view of the fuel tank apparatus of FIG. 1 with the first lifting apparatus in a lowered configuration, according to one or more embodiments shown and described herein.

A fuel tank T is represented by the dashed line. Placing the fuel tank T on the positioning mounts 26 and 28 positions at least part of the fuel tank T above the powered fastening guns 38 and 40 initially. Referring now to FIG. 2, the first lifting apparatus 16 is illustrated in a lowered configuration.

The actuators 22 and 24 are used to lower the second lifting base 20 to a lowered position, which also lowers the positioning mounts 26 and 28. The fuel tank T travels with the positioning mounts 26 and 28 until the fuel tank T engages the powered fastening guns 38 and 40. The powered fastening guns 38 and 40 may have fastening ends that are sized to receive fasteners 44 (e.g., bolts). When the fuel tank T is lowered to the illustrated lowered position the fasteners 44 may be received within mount openings of the fuel tank T. The fuel tank T is supported on the powered fastening guns 38 and 40 with the first lifting apparatus 16 in the lowered configuration.

Figure 3:
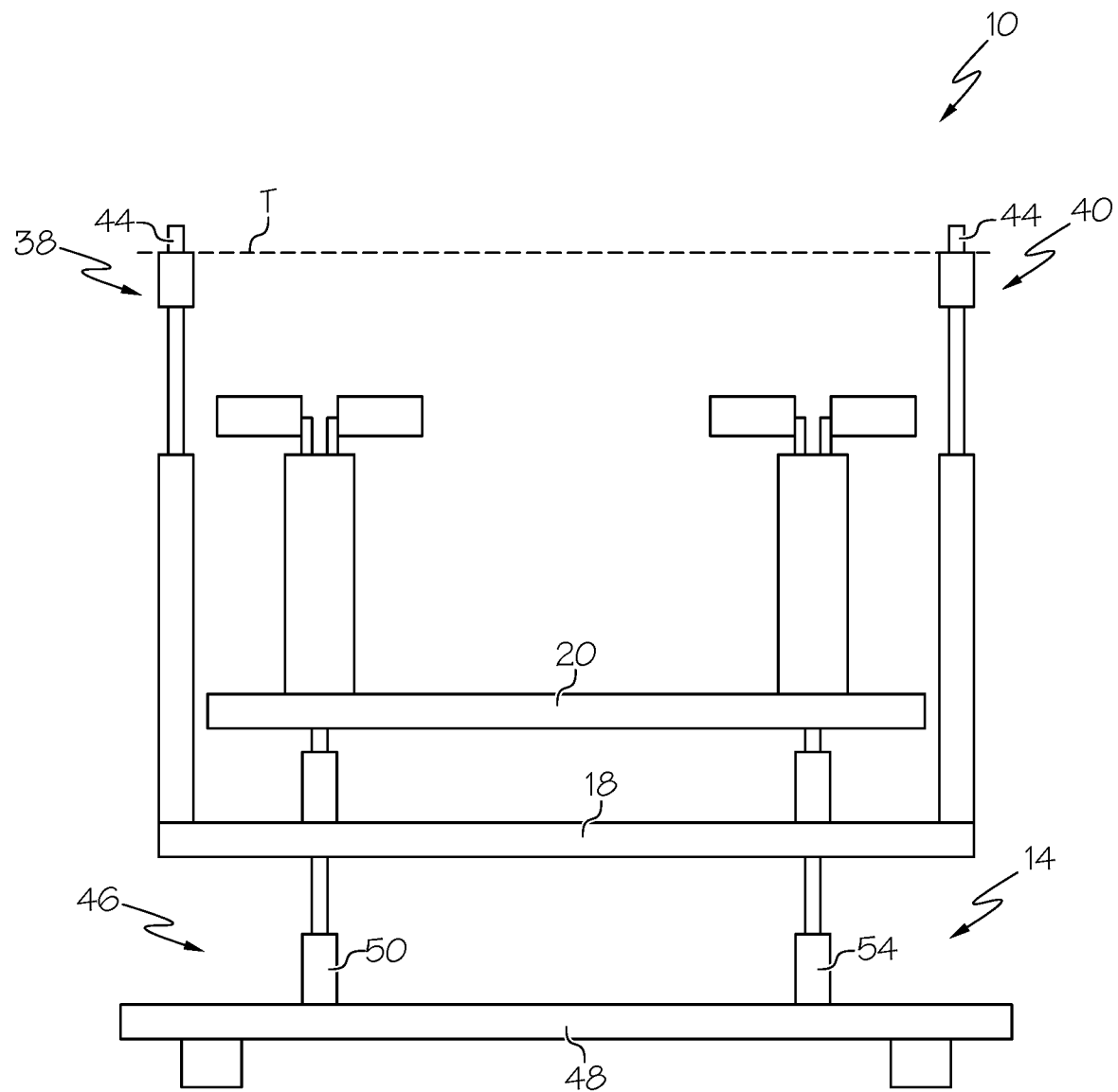
FIG. 3 is another diagrammatic end view of the fuel tank lifting apparatus of FIG. 1 with the first lifting apparatus in the lowered configuration and the second lifting apparatus in a raised configuration, according to one or more embodiments shown and described herein.

FIG. 3 illustrates a second lifting apparatus 46 in a raised configuration. In the raised configuration, the fasteners 44 may be arranged and located to be received within mounting openings on a vehicle. In the raised configuration, an operator may simultaneously activate the powered fastening guns 38 and 40 and the fuel tank T may be mounted to the vehicle.

As mentioned above, the fuel tank lifting apparatus 10 includes the final lift and lowering stage 14 that includes the second lifting apparatus 46. The second lifting apparatus 46 includes a third lifting base 48 and actuators 50 and 54 that are located between the third lifting base 48 and first lifting base 18. The actuators 50 and 54 are used to lift the entire first lifting apparatus 16 in the lowered configuration with the fuel tank T located on the powered fastening guns 38 and 40.

Figure 4:
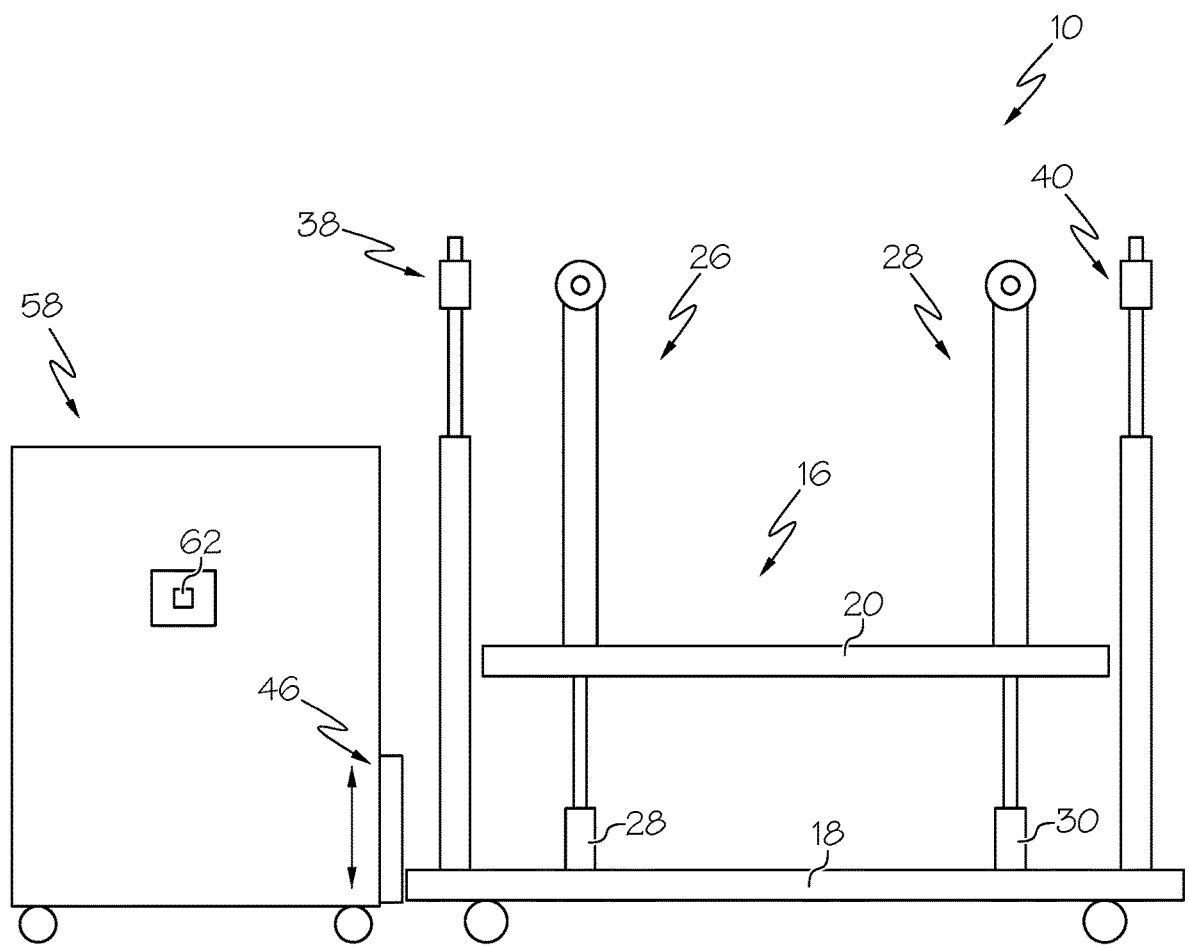
FIG. 4 is a diagrammatic side view of the fuel tank lifting apparatus including a control and lifting unit, according to one or more embodiments shown and described herein.

Referring to FIG. 4, a diagrammatic side view of the fuel tank lifting apparatus 10 is illustrated as including a control and lifting unit 58. The control and lifting unit 58 may include the second lifting apparatus 46 that lifts and lowers the first lifting apparatus 16 as represented by the arrow. In some embodiments, the control and lifting unit 58 may also include a control 62, which can be used to operate the actuators 28, 30, 50 and 54 and the powered fastening guns 38 and 40 simultaneously, e.g., using switches, buttons, etc. The fuel tank lifting apparatus 10 may also include wheels 66 so that the fuel tank lifting apparatus 10 can be moved toward and away from a vehicle as desired.

Figure 5:
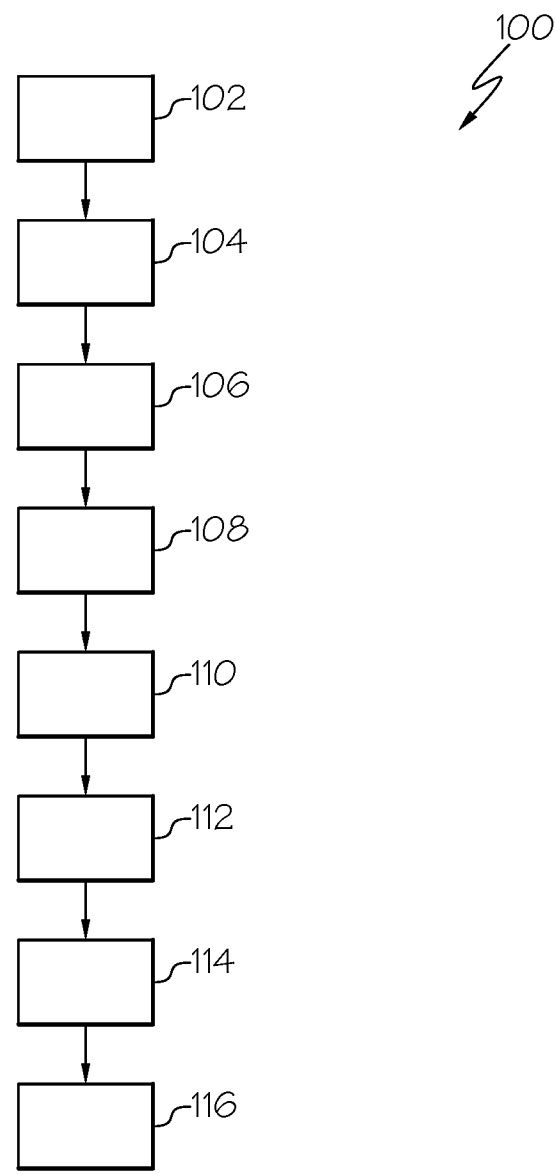
FIG. 5 is a method of installing a fuel tank using the fuel tank lifting apparatus of FIG. 4, according to one or more embodiments shown and described herein.

Referring to FIG. 5, a method 100 of installing a fuel tank using the fuel tank lifting apparatus is illustrated. The method 100 includes moving the fuel tank lifting apparatus toward a vehicle at step 102. Fasteners may be placed within the fastening ends of the fastening guns at step 104. At step 106, with the first lifting apparatus in the raised configuration and the positioning arms 34 and 36 located at least partially above the powered fastening guns 38 and 40, the fuel tank is placed on the positioning arms 34 and 36, which support the weight of the fuel tank thereon. At step 108, the second base is lowered placing the first lifting apparatus is the lowered configuration. At step 110, the fasteners are located within the mount openings of the fuel tank as the second base is lowered. In this lowered configuration, the first lifting apparatus is lifted by the second lifting apparatus at step 112. At the first lifting apparatus is lifted to the raised position, the fasteners are received within mount openings of the vehicle at step 114. At step 116, the powered fastening guns may be activated simultaneously using the control thereby tightening the fasteners into the mount openings of the vehicle and mounting the fuel tank to the vehicle.

The above-described fuel tank lifting apparatuses can be used to lift fuel tanks into position in a reliable fashion while automating portions of the assembly process. The fuel tank lifting apparatuses can be used to lift multiple variations of fuel tanks, such as gas, hybrid and all-wheel drive models. By simultaneously actuating the powered fastening gun using a single control, the time it takes to mount the fuel tank to the vehicle can be greatly reduced (e.g., under 20 seconds). The control and lifting unit may be provided that can include the second lifting apparatus that is used to raise and lower a first lifting apparatus regardless of whether the first lifting apparatus is in the raised or lowered configuration.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A fuel tank lifting apparatus comprising:
  a first lifting apparatus comprising:
    a first lifting base;
    a second lifting base that is connected to the first lifting base by a first actuator;
    a positioning mount fixedly mounted to the second lifting base, the positioning mount comprising a positioning head configured to support a fuel tank thereon; and
    a powered fastening gun fixedly mounted to the first lifting base;
    wherein the first actuator raises and lowers the second lifting base relative to the first lifting base such that the positioning head of the positioning mount is located above the powered fastening gun in a raised configuration and below the powered fastening gun in a lowered configuration; and
  a second lifting apparatus comprising a second actuator that raises and lowers the first lifting assembly.

2. The fuel tank lifting apparatus of claim 1 further comprising a lifting unit comprising the second lifting apparatus.

3. The fuel tank lifting apparatus of claim 2, wherein the lifting unit comprises a control that controls operation of the first actuator and the second actuator.

4. The fuel tank lifting apparatus of claim 3, wherein the control controls operation of the powered fastening gun.

5. The fuel tank lifting apparatus of claim 4 comprising multiple fastening guns, wherein the control activates the multiple fastening guns simultaneously.

6. The fuel tank lifting apparatus of claim 1, wherein the positioning mount is a first positioning mount, the fuel tank lifting apparatus further comprising a second positioning mount fixedly mounted to the second lifting base, the first and second positioning mounts configured to support the fuel tank thereon.

7. A method of installing a fuel tank using a fuel tank lifting apparatus, the method comprising:
  moving the fuel tank lifting apparatus toward a vehicle, the fuel tank lifting device comprising:
    a first lifting apparatus comprising:
      a first lifting base;
      a second lifting base that is connected to the first lifting base by a first actuator;

a positioning mount fixedly mounted to the second lifting base, the positioning mount configured to support a fuel tank thereon; and a powered fastening gun fixedly mounted to the first lifting base;

wherein the first actuator raises and lowers the second lifting base relative to the first lifting base; and a second lifting apparatus comprising a second actuator that raises and lowers the first lifting assembly;

lifting the first lifting apparatus using the second lifting apparatus with the fuel tank carried by the powered fastening gun.

8. The method of claim 7 further comprising placing a fastener within a fastening end of the powered fastening gun.

9. The method of claim 8 further comprising placing the fuel tank on the positioning mount with the first lifting apparatus in a raised configuration.

10. The method of claim 9 further comprising lowering the second lifting base relative to the first lifting base thereby lowering the fuel tank onto the fastening gun whereby the fastener is received by a mount opening of the fuel tank.

11. The method of claim 10, wherein the step of lifting the first lifting apparatus using the second lifting apparatus with the fuel tank carried by the powered fastening gun is performed after the step of lowering the second lifting base relative to the first lifting base.

12. The method of claim 11 further comprising actuating the powered fastening gun thereby mounting the fuel tank to the vehicle.

* * * * *